2,894,950

METHOD OF PRODUCING TRIALLYL ISOCYANURATE

Billy E. Lloyd and Fred L. Kelly, Chester, Va., assignors to Allied Chemical Corporation, New York, N.Y., a corporation of New York No Drawing. Application July 2, 1957
Serial No. 669,437

3 Claims. (Cl. 260—248)

This invention relates to an improved method of producing triallyl isocyanurate.

Triallyl isocyanurate is a known compound having utility for a number of purposes. For example, it is a valuable insecticide. It is also a monomer which can be converted into resinous polymers and copolymers having high resistance to chemical action.

Processes heretofore proposed for the manufacture of this compound have not been satisfactory for a number of reasons. Thus, they have involved the use of expensive starting materials such as allyl alcohol, or the use of special solvents which add to the initial cost of the process and require the inclusion of a solvent recovery procedure for their economical operation, such as acetonitrile.

An object of the present invention is to provide improvements in the method of manufacturing triallyl isocyanurate from readily available and inexpensive raw materials, whereby triallyl isocyanurate can be obtained in high yield.

A further object of the present invention is to provide improvements in the method of producing triallyl isocyanurate from cyanuric acid and allyl chloride, whereby the reaction can be carried out in an aqueous reaction medium.

Another object of the present invention is to provide improvements in the method of producing triallyl isocyanurate from cyanuric acid and allyl chloride, whereby a triallyl isocyanurate product which is capable of being readily polymerized to a resinous polymer or copolymer can be obtained.

Additional objects in part will be obvious and in part will appear hereinafter.

When allyl chloride is reacted with cyanuric acid and sodium hydroxide in stoichiometrical portions, only low yields of triallyl isocyanurate are obtained owing to the fact that two competitive reactions take place; (1) the desired formation of triallyl isocyanurate, and (2) the undesired reaction between allyl chloride and sodium hydroxide to form allyl alcohol. Besides, considerable time is required for completion of the desired reaction.

We have discovered that high yields of triallyl isocyanurate can be obtained from allyl chloride and cyanuric acid in an aqueous medium by proper control of the conditions under which the reaction is carried out.

According to one feature of the present invention, the reaction between allyl chloride and cyanuric acid is carried out in an aqueous reaction medium which is initially alkaline, but which contains less than the stoichiometric proportion of alkali, more particularly not more than 2 mols, and preferably not more than 1½ mols, of caustic alkali per mol of cyanuric acid; the allyl chloride is added in a total amount greatly in excess of that theoretically required; and alkali is added during the course of the reaction. Preferably a total amount of allyl chloride equal to at least 5 mols per mol of cyanuric acid is employed, and for best results, a total amount of allyl chloride is used equal to at least 6 mols per mol of cyanuric acid; and a total amount of alkali equal to at least 3 mols per mol of cyanuric acid is employed, preferably a sufficient amount to maintain the by-products of the reaction in solution.

In the preferred practice of the present invention the allyl chloride is added gradually (that is, in portions or continuously) during the course of the reaction while maintaining the reaction mixture alkaline.

According to another feature of the present invention, the reaction between the allyl chloride and cyanuric acid is carried out in an aqueous reaction medium which contains a small amount of an organic anionic surface-active agent having a sulfur-oxygen linkage in a molecule that contains at least 8 carbon atoms.

We have discovered, when the reaction is carried out in accordance with the present invention, and especially when employing a surface-active agent of the type referred to above in conjunction with the gradual addition of a large excess of allyl chloride and the addition of alkali during the course of the reaction, that the rate of reaction between cyanuric acid and allyl chloride leading to the formation of triallyl isocyanurate is materially increased, resulting in a material increase in the yield of triallyl isocyanurate with only moderate increase in production of allyl alcohol. This result is surprising since it was to have been expected that the addition of excess allyl chloride to an alkaline reaction mixture would lead to formation of large amounts of allyl alcohol.

According to a further feature of the present invention, the allyl chloride is gradually added to an aqueous mixture of cyanuric acid and sufficient alkali to render the reaction mixture alkaline, but not exceeding 2 mols and preferably not more than 1½ mols of alkali per mol of cyanuric acid, and the alkalinity of the reaction mixture is maintained substantially within the range pH 9.5 to pH 11 substantially throughout the reaction, by suitable additions of alkali. We have found, when the alkalinity of the reaction mixture is maintained within the stated limits, and especially at pH 10 to pH 10.5, the resulting triallyl isocyanurate is readily polymerizable; whereas, if the alkalinity of the reaction mixture exceeds pH 11 for a substantial part of the reaction period the resulting triallyl isocyanurate is mainly in a non-polymerizable form.

In order to secure a rate of reaction suitable for commercial operation, the reaction mixture is preferably heated to a temperature of at least 60° C., although lower temperatures may be used. The process can be carried out at atmospheric pressure or at higher pressures. At temperatures above 40° C. (for example, at temperatures of 60° to 100° C.), suitable reflux apparatus or operation in a closed reaction vessel is employed in view of the volatility of allyl chloride.

In the practice of the present invention, cyanuric acid is mixed with caustic alkali, and preferably also a small amount of a surface-active agent having a sulfur-oxygen linkage in a molecule that contains at least 8 carbon atoms, in water as the reaction medium. The amount of caustic alkali employed initially is at least sufficient to render the mixture alaline (at least 0.7 mol per mol of cyanuric acid employed), but is less than the stoichiometric proportion, more especially not exceeding 2 mols, and preferably not exceeding 1½ mols, per mol of caustic alkali. Only a small amount of the organic surface-active agent need be used, for instance 0.1 to 5.0 percent of the weight of the cyanuric acid, since its function is to disperse the subsequently added allyl chloride and secure intimate contact between the components of the reaction mixture. Allyl chloride is then added gradually, for instance in small portions, to the mixture with stirring, while heating the mixture, preferably so as to maintain the temperature at least at 60° C. During the course of the addition of the allyl chloride, caustic alkali is also added, preferably in small amounts proportioned to the addition of the allyl chloride but sufficient to maintain the reaction mixture alkaline. The total amount of allyl chloride added is in excess of 5 mols per mol of cyanuric acid initially employed. Preferably the total amount of allyl chloride is 6 to 9 mols per mol of cyanuric acid.

In the preferred practice of the present invention, the allyl chloride is added in portions at substantially the rate at which it is consumed in the reaction, and the alkalinity of the reaction mixture is maintained between pH 9.5 and pH 11. For the production of a superior triallyl isocyanurate especially useful for the production of polymers and copolymers, the alkalinity of the reaction mixture is preferably maintained at a pH of 10 to 10.5.

If desired, mono-, di- or trialkali metal salt of cyanuric acid may be employed instead of cyanuric acid and caustic alkali as the initial material, but the operation is more simply carried out by employing cyanuric acid and caustic alkali.

The organic surface-active agents employed in accordance with the present invention include various surface-active agents, and especially dispersing agents, having a sulfur-oxygen linkage in a molecule that contains at least 8 carbon atoms. They comprise higher alkyl sulfates and sulfonates, higher alkylaryl sulfonates, and other organic surface-active compounds having a sulfur-oxygen linkage in a molecule that contains 8 carbon atoms. A preferred class are the organic alkali metal sulfonates having in the molecule an alkyl hydrocarbon chain of at least 10 carbon atoms.

One type of such surface-active agent are nitrosation-sulfitation products comprising salts of mixtures of organic acids having carbon contents within the range 10 to 30 carbon atoms, such mixtures including sulfonated ketones, sulfonated amines, sulfonated alkylidene sulfamates, sulfonated sulfamates and bisulfite addition products of sulfonated alkylidine sulfamates, and being derived from an unsaturated compound having at least one non-aromatic

linkage and a carbon content within the range 10 to 30 carbon atoms, by a process involving reaction of a nitrosating agent with a non-aromatic

linkage of the unsaturated organic compound and reaction of the resulting nitrosation product with a sulfite.

Nitrosation-sulfitation products of such type and methods for their preparation are described in detail in U.S.P. 2,265,993 of December 16, 1941; 2,313,719 of March 16, 1943; and 2,336,387 of December 7, 1943.

Preferred nitrosation-sulfitation products are those having carbon contents within the range 12 to 23 carbon atoms, and comprising mixtures of organic sulfonates, particularly open-chain organic sodium sulfonates, including sulfonated ketones, sulfonated amines, sulfonated alkylidene sulfamates, sulfonated sulfamates (especially sulfonated alkyl sulfamates) and bisulfite addition products of sulfonated alkylidene sulfamates in the form of alkali metal and ammonium salts, which have been produced from a carboxyl-substituted unsaturated hydrocarbon or from an olefin hydrocarbon or from a mixture of olefin hydrocarbons obtained from petroleum, having at least one non-aromatic

linkage and a carbon content within the range 12 to 23 carbon atoms, by a process involving reaction of a nitrosating agent (for example, NOCl, NOBr, $N_2O_4$ or $N_2O_3$) with a non-aromatic

linkage of said unsaturated organic compound and reaction of the resulting nitrosation product with an alkali metal or ammonium sulfite.

The unsaturated organic compounds employed as intermediates for the nitrosation products include olefin hydrocarbons and carboxyl derivatives thereof comprising free carboxylic acids, their esters, salts, amides, chlorides, and the corresponding nitriles. Starting materials especially adapted for the manufacture of the nitrosation-sulfitation products employed in the invention are mono-olefins of which at least 8 of the carbon atoms are disposed in a continuous carbon chain. Mono-olefins having a carbon content which lies within the range 12 to 23 carbon atoms are especially suitable. (It is to be understood that, where ranges are given herein, they include the limits.) The use of mixtures comprising olefins of different chain length within the aforesaid range is advantageous.

In addition to organic compounds, the nitrosation-sulfitation products comprise a mixture of inorganic salts formed in the reactions involved in such preparation, these inorganics including sodium sulfite, sodium bisulfite, sodium chloride and sodium sulfate, with a small amount of sodium sulfamate also often present. Usually the nitrosation-sulfitation products of the invention contain from 30 to 40% organic compounds, 10 to 30% of a mixture of sodium sulfite and sodium bisulfite, 5 to 15% sodium chloride and 20 to 40% sodium sulfate. A typical product is one containing about 35% organic compounds, 25% sodium sulfite and bisulfite mixture, 10% sodium chloride and 30% sodium sulfate. However, suitable nitrosation-sulfitation products, free of inorganic salts, for use in the instant process may be obtained in the manner disclosed in U.S. Patent 2,436,243, i.e., by extracting aqueous solutions of products resulting from the nitrosation and sulfitation reactions noted above with a solvent such as isopropanol, isobutanol or tertiary butanol, followed by removal of the solvent. While the resulting products free of inorganic compounds are applicable in any process, it is simpler to use the unrefined nitrosation-sulfitation product mixtures containing the inorganics formed during preparation.

Another type of organic surface-active agent particularly useful in accordance with the present invention are the higher alkylaryl sulfonates comprising a water-soluble salt or mixtures of water-soluble salts of mononuclear aryl hydrocarbon sulfonic acids that have as a nuclear substituent one higher alkyl radical which contains on the average 12 to 23 carbon atoms, and especially 12 to 16 carbon atoms. Advantageous alkylaryl sulfonates are those commonly used as detergents and wetting agents and which are higher alkylaryl sulfonates in the form of mixtures of neutral water-soluble salts, especially sodium salts of higher alkylaryl sulfonic acids in which the aryl nucleus is a mononuclear aryl hydrocarbon radical, and particularly those in which the higher alkyl radicals contain, on the average, from about 12 to about 16 carbon atoms; and preferably compositions comprising essentially sodium sulfate-containing mixtures of said type (particularly, sodium sulfate-containing mixtures of alkylbenzene sodium sulfonates) having as nuclear substituents alkyl radicals having, on the average, from about 12 to about 16 carbon atoms. Higher alkylaryl sulfonates especially advantageous for use in accordance with the present invention are those consisting essentially of higher alkylbenzene (or higher alkyltoluene) sodium sulfonate mixtures of which the higher alkyl groups correspond to the hydrocarbons of a petroleum fraction of a kerosene boiling range.

Alkylaryl sulfonate compositions of this type and methods for their preparation are disclosed, for example, in U.S. Patents 2,233,408; 2,247,365; 2,267,725; 2,283,199; 2,298,650; 2,298,651; 2,298,696; 2,340,654; 2,364,782; 2,387,572; 2,393,526; and 2,477,383; and British Patent 416,379.

The invention will be illustrated by the following specific examples, but it is to be understood that the invention is not limited to their details and that changes may be made without departing from its scope. The temperatures are in degrees centigrade and the parts and percentages are by weight, unless designated as parts by volume. Where parts are by volume, the amount signifies the volume occupied by the same number of parts by weight of water at 4° C.

*Example 1*

To a mixture of 65 parts (0.5 mol) of cyanuric acid, 0.5 part of a commercial nitrosation-sulfitation product of the type referred to above ("Nytron") and 700 parts of water, 62.5 parts of a 23% aqueous sodium hydroxide solution were added. The resulting mixture had a pH of 10.5. The mixture was heated to 65°, and 230 parts (3.0 mol) of allyl chloride were added at a substantially uniform rate in five hours, while stirring and maintaining the temperature of the reaction mixture at 65°±2°. During the reaction period an additional 289 parts of the 23% sodium hydroxide solution were added at the rate required to maintain the pH of the reaction mixture at 10.5±0.2. The reaction mixture was then heated an additional hour at 65°. The resulting reacted mixture was cooled and the crude triallyl isocyanurate which separated as an oily layer on standing was removed.

The remaining aqueous solution was distilled to remove and recover allyl alcohol formed as a byproduct of the reaction, and the aqueous residue was washed several times with heptane.

The crude triallyl isocyanurate was combined with the heptane extracts and the resulting solution was dried over anhydrous magnesium sulfate. The heptane was removed by evaporation on a steam bath at reduced pressure (between 20 and 300 mm. Hg.), leaving 92.6 parts of crude triallyl isocyanurate, which corresponds to a yield of 74.4 percent of theory. Acidification of the aqueous solution with dilute sulfuric acid to pH 5 gave 17.5 parts of crude diallyl isocyanurate.

The triallyl isocyanurate was further purified by vacuum distillation at about 4–5 mm. Hg. Infra-red spectrography confirmed that it was triallyl isocyanurate. To test its polymerizability, the purified triallyl isocyanurate was warmed with a catalytic amount of benzoyl peroxide. It formed a hard resin.

*Example 2*

The process of Example 1 was repeated, but with the substitution of 0.5 part of a commercial higher alkylbenzene sodium sulfonate detergent of the type disclosed in U.S. Patents 2,283,199 and 2,387,572 ("Nacconol NR") instead of the nitrosation-sulfitation product employed therein.

A yield of 78.5 parts of triallyl isocyanurate was obtained, which corresponds to 63% of theory. Acidification of the aqueous solution with dilute sulfuric acid to pH 5 gave 16.0 parts of crude diallyl isocyanurate.

The triallyl isocyanurate was further purified by vacuum distillation at about 4–5 mm. Hg. To test its ability to polymerize, the purified triallyl isocyanurate was warmed with a catalytic amount of benzoly peroxide. It formed a hard clear resin.

*Example 3*

A mixture was formed from 97 parts of cyanuric acid, 4½ parts of a commercial nitrosation-sulfitation product of the type employed in Example 1 ("Nytron"), 7½ parts of sodium iodide, 90 parts of sodium hydroxide and 1200 parts of water. To this mixture, 172 parts of allyl chloride were added. The resulting reaction mixture was heated in a sealed autoclave at 90±2° for an hour with stirring. The autoclave was then cooled to room temperature and opened. The pH of the reaction mixture at this time was 7. An additional 90 parts of sodium hydroxide and 172 parts of allyl chloride were added to the reaction mixture in the autoclave, and the autoclave was again sealed and heated at 90° for an hour. The autoclave was then cooled and opened. The pH of the reaction mixture was again 7. Another addition of 90 parts of sodium hydroxide and 172 parts of allyl chloride was made, and the autoclave was sealed and heated for an additional hour at 90±2°. The autoclave was finally cooled to room temperature, and the liquid contents were extracted with 1500 parts of heptane. Evaporation of the heptane extract gave 172 parts of triallyl isocyanurate, which corresponds to a yield of 92.5% of theory.

The triallyl isocyanurate was further purified by vacuum distillation at about 2–3 mm. Hg. To test its ability to polymerize, the distilled product was warmed with a catalytic amount of benzoyl peroxide. It did not form a hard resin.

It will be realized by those skilled in the art that changes can be made in the above examples without departing from the scope of the invention.

Thus, instead of sodium hydroxide, other alkalis may be employed, such as potassium hydroxide.

The amount of water used in forming the reaction mixture is not critical. Preferably an amount is employed which is sufficient to dissolve a major portion of the alkali metal cyanurate which forms.

For the preparation of a substantially pure triallyl isocyanurate, the product is subjected to a final distillation at a low pressure (high vacuum). Such a purification is not essential to the obtainment of a readily polymerizable product, provided the alkalinity of the reaction mixture employed in the formation of the triallyl isocyanurate is maintained within the limits set out above. Futhermore, the product may be purified in other ways; for example by flash evaporation of volatile impurities, crystallization from solvents, treatment with activated charcoal, or washing with dilute aqueous ammonia.

We claim:

1. A method of producing triallyl isocyanurate by reaction between cyanuric acid, caustic alkali and allyl chloride which comprises, forming a mixture of cyanuric acid and caustic alkali in an aqueous reaction medium, the mol ratio of caustic alkali to cyanuric acid being at least 0.7:1, gradually adding allyl chloride to said mixture in a total amount equal to a mol ratio to cyanuric acid of at least 5:1, adding caustic alkali to said mixture in amounts proportioned to the addition of allyl chloride so as to maintain the alkalinity of the reaction mixture between pH 9.5 and pH 11 substantially throughout the reaction period, maintaining the temperature of the reaction mixture between 60° and 100° C., and recovering triallyl isocyanurate from the resulting reaction product.

2. A method of producing triallyl isocyanurate by reaction between cyanuric acid, caustic alkali and allyl chloride which comprises, forming a mixture of cyanuric acid and caustic alkali in an aqueous reaction medium, the amount of caustic alkali being at least that required to render the mixture alkaline but not exceeding 1½ mols per mol of cyanuric acid, gradually adding allyl chloride to said mixture in a total amount equal to a mol ratio to cyanuric acid of at least 6:1, adding caustic alkali to said mixture in amounts proportioned to the addition of allyl chloride so as to maintain the alkalinity of the reaction mixture between pH 9.5 and pH 11 substantially throughout the reaction period, and recovering triallyl isocyanurate from the resulting reaction product.

3. A method as defined in claim 1 wherein the alkalinity of the reaction mixture is maintained at pH 10 to pH 10.5.

References Cited in the file of this patent

UNITED STATES PATENTS 2,296,823     Pollack               Sept. 22, 1942

FOREIGN PATENTS 483,553     Canada               May 27, 1952